United States Patent Office 3,655,711
Patented Apr. 11, 1972

3,655,711
PREPARATION OF CYCLIC NITROGEN-CONTAINING ORGANOSILICON COMPOUNDS
Richard Paul Bush, Penarth, Glamorgan, and Bryan Thomas, Thomastown, Glamorgan, Wales, assignors to Midland Silicones Limited, Reading, Berkshire, England
No Drawing. Filed Jan. 13, 1971, Ser. No. 106,268
Claims priority, application Great Britain, Jan. 13, 1970, 1,611/70; May 8, 1970, 22,429/70
Int. Cl. C07f 7/10
U.S. Cl. 260—448.2 N                     6 Claims

ABSTRACT OF THE DISCLOSURE

Process for the production of N-substituted cyclotrisilazanes which comprises reacting, preferably at a temperature below 50° C., chlorodimethylsilane and a cyclosilazane of the general formula $(R_2SiNH)_n$ in which R is a monovalent hydrocarbon radical having less than 7 carbon atoms and $n$ is 3 or 4.

The $N,N^1$-bis(dimethylsilyl)cyclotrisilazanes which can be prepared by the process are claimed as novel compounds.

---

The novel compounds are useful as intermediates in the production of polymers; for example, the compounds can be added to vinyl siloxanes in an Si—H to C—C addition.

This invention relates to the preparation of certain cyclic nitrogen-containing organosilicon compounds and to a particular novel member of this class of compounds.

British patent specification No. 1,086,250 describes a process for the production of disilazanes by reacting a linear or cyclic silazane with a dichlorosilane or with a monochlorosilane. While that specification exemplifies such a process in respect of the reaction of dichlorosilanes with both linear and cyclic silazanes, the reaction of monochlorosilanes is illustrated only with respect to linear silazanes. We have now investigated the reaction of chlorodimethylsilane, $(CH_3)_2HSiCl$ with cyclotrisilazanes and cyclotetrasilazanes $(R_2SiNH)_n$, where R is a hydrocarbon radical and $n$ is 3 or 4, and we find that unexpected products are obtained. Thus while the products obtained according to the process of the aforesaid specification are shown to be linear disilazanes, we have found that in our reaction a substituted cyclotrisilazane is formed. Thus our reaction can be depicted as:

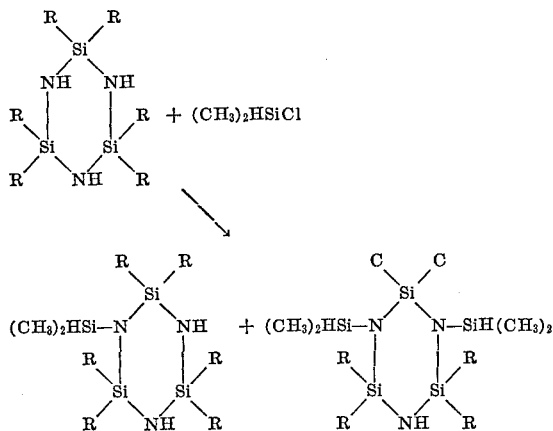

The same products are also formed with a cyclotetrasilazane is reacted with chlorodimethylsilane and presumably in this case there is an initial ring contraction reaction to prepare the corresponding cyclotrisilazane. The N,N'-disubstituted cyclotrisilazanes are novel compounds and constitute a further aspect of the invention.

Accordingly, from one aspect the invention provides a process for the production of N-substituted cyclotrisilazanes of the general formula

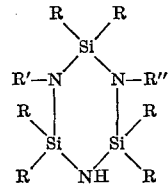

wherein each R represents a monovalent hydrocarbon radical having less than 7 carbon atoms, R' represents the group $(CH_3)_2HSi$— and R" represents a hydrogen atom or an R' group, which comprises reacting chlorodimethylsilane with a cyclosilazane of the formula

$(R_2SiNH)_n$ in which R is as defined above and $n$ is 3 or 4.

From a second aspect the invention provides N,N'-bis-(dimethylsilyl)cyclotrisilazanes of the formula

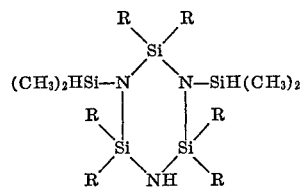

where R is a monovalent hydrocarbon radical having less than 7 carbon atoms.

Reaction between the cyclosilazane and chlorosilane according to the process of this invention may be carried out at elevated temperatures, for example from 100 to 200° C. The application of external heat is however, not essential. Production of two methyl-substituted cyclotrisilazanes may also be carried out by mixing the reactants and allowing them to stand at ambient temperatures, for example from 10 to 25° C. The reaction mixture may be warmed slightly but the reaction is preferably performed at temperatures below 50° C. Such low temperature reaction appears to result in better yields of the desired products and for this reason represents the preferred method of carrying out the preparative process.

When the reaction is performed at temperatures below about 50° C. optimum yields of product are obtained if there is included in the reaction mixture an acceptor for hydrogen chloride. The use of an acceptor may also be advantageous when the reaction is performed at elevated temperature. Suitable compounds for this purpose are well-known and include pyridine, collidine, triethylamine and trimethylamine.

An inert solvent or diluent may be employed, if desired. For example the solvent may be a hydrocarbon, such as hexane, benzene, toluene or xylene, or it may be a polar compound, such as an ether for example tetrahydrofuran or dioxan. If necessary the reaction may be conducted under pressure in a sealed vessel or autoclave.

The chlorodimethylsilane reactant is commercially available and the cyclosilazanes are also readily obtainable according to published procedures. The cyclosilazane may be a cyclotrisilazane and/or a cyclotetrasilazane depending on availability. Preferably the R radicals therein are all methyl, but a number of them may also be other monovalent hydrocarbon radicals having less than 7 carbon atoms, for example, ethyl, propyl, vinyl or phenyl.

The chlorosilane and cyclosilazane may be reacted in stoichiometric proportions according to the product desired. To obtain the novel N,N'-bis(dimethylsilyl)cyclotrisilazanes by reaction at elevated temperatures from 2.0 to 5.0 molecular proportions of chlorodimethylsilane are preferably employed per molecular proportion of the cyclosilazane. However, when the reaction is carried out at temperatures below about 50° C. optimum yields of the novel silazanes are obtained if a stoichiometric deficiency of the chlorosilane is employed. It is thought that when the reaction is carried out at ambient or moderate temperature, competing side reactions are minimised so that the desired substitution reaction then predominates. Moreover, when a strictly stoichiometric quantity of the chlorosilane is used in such circumstances the product may be contaminated with the tris-substituted product. Thus when the N,N'-dimethylsilylcyclotrisilazanes are the desired products the chlorodimethylsilane is preferably reacted with the cyclosilazane $(R_2SiNH)_n$ in a molar ratio of chlorodimethylsilane to cyclosilazane of about 1.5:1 at about 20° C. At temperatures between 20° C. and 100° C. the said molar ratio should vary between 1.5:1 and 2:1.

The progress of the reaction can be monitored by suitable analytical techniques e.g. by gas-liquid chromatography. The products are recovered and purified by, for example, fractional distillation.

The products from the process of the invention find use as intermediates in the production of polymers, for example by causing the silanic-hydrogen atoms to undergo an addition reaction with compounds containing ethylenic unsaturation e.g. vinyl siloxanes, a reaction which occurs under influence of a platinum or free-radical catalyst.

The invention is illustrated by the following examples:

EXAMPLE 1

Hexamethylcyclotrisilazane (56.3 g.) was reacted with an equimolar proportion of chlorodimethylsilane (24.3 g.) and heated at 150° C. for 24 hours. Fractional distillation yielded unreacted hexamethylcyclotrisilazane (12.0 g.) and 1-dimethylsilyl-2,2,4,4,6,6-hexamethylcyclotrisilazane (22 g.) having a boiling point of 58° C. at 0.8 mm. (Found: C, 35.1; H, 9.6; N, 14.5; Si, 40.1%. $C_8H_{28}N_3Si_4$ requires C, 34.5; H, 10.1; N, 15.1; Si, 40.4%), the structure of which was confirmed by infrared and nuclear magnetic resonance spectroscopy.

EXAMPLE 2

A mixture of octamethylcyclotetrasilazane (46.4 g.) and two molecular proportions of chlorodimethylsilane (30.0 g.) was heated together for 24 hours at 150° C. Fractional distillation yielded 1-dimethylsilyl-2,2,4,4,6,6-hexamethylcyclotrisilazane (17.0 g., 38% yield) and 1,3-bis(dimethylsilyl) - 2,2,4,4,6,6-hexamethylcyclotrisilazane (8.0 g., 15.0%). Both products were characterized by infrared and nuclear magnetic resonance spectroscopy.

EXAMPLE 3

Example 2 was repeated using double the proportion of chlorodimethylsilane. The yield of 1,3-bis-(dimethylsilyl)-2,2,4,4,6,6-hexamethylcyclotrisilazane increased to 18%.

EXAMPLE 4

Hexamethylcyclotrisilazane (70.7 g., 2 mol.), chlorodimethylsilane (45.8 g., 3 mol.) and pyridine (38.3 g., 3 mol.) were mixed and allowed to stand at room temperature for 4 days. The mixture was filtered to remove pyridine hydrochloride and distilled to give 1,3-bis(dimethylsilyl)-2,2,4,4,6,6-hexamethylcyclotrisilazane (30 g., 37%) B.P. 86°/0.5 mm. (Found: C, 35.0; H, 9.9; N, 12.0; Si, 40.25. $C_{10}H_{33}N_3Si_5$ requires C, 35.8; H, 9.85; N, 12.5; Si, 41.8%.) The product was further identified by its infrared N.M.R. spectra.

EXAMPLE 5

The process of Example 1 was repeated but using only 30.6 g. of chlorodimethylsilane (2 mol.). The product was shown to consist of approximately equal weights of 1-dimethylsilyl-2,2,4,4,6,6-hexamethylcyclotrisilazane and 1,3 - bis(dimethylsilyl) - 2,2,4,4,6,6 - hexamethylcyclotrisilazane.

EXAMPLE 6

The process of Example 1 was again repeated but using 61.2 g. of chlorodimethylsilane (4 mols.). The product was largely 1,3-bis-(dimethylsilyl)-2,2,4,4,6,6-hexamethylcyclotrisilazane associated with a significant amount of 1,3,5-tris-(dimethylsilyl)-2,2,4,4,6,6-hexamethylcyclotrisilazane.

That which is claimed is:

1. A process for the production of N-substituted cyclotrisilazanes

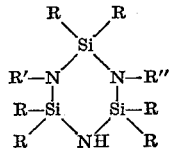

wherein each R represents a monovalent hydrocarbon radical having less than 7 carbon atoms, R' represents the group $(CH_3)_2HSi-$ and R" is selected from the group consisting of the hydrogen atom and the group $(CH_3)_2HSi-$ which comprises reacting chlorodimethylsilane with a cyclosilazane of the general formula $(R_2SiNH)_n$, in which R is as defined above and $n$ has the value of 3 or 4.

2. A process as claimed in claim 1 wherein the chlorodimethylsilane and the silazane are reacted at a temperature below 50° C.

3. A process as claimed in claim 1 wherein the reaction is carried out employing a stoichiometric deficiency of the chlorodimethylsilane.

4. A process as claimed in claim 1 wherein the reaction is carried out in the presence of a hydrogen chloride acceptor.

5. N,N'-bis(dimethylsilyl)cyclotrisilazanes of the general formula

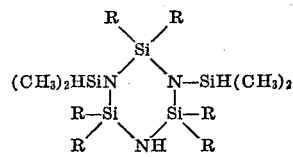

wherein each R represents a monovalent hydrocarbon radical having less than 7 carbon atoms.

6. The compound 1,3-bis(dimethylsilyl)-2,2,4,4,6,6-hexamethylcyclotrisilazane.

References Cited

UNITED STATES PATENTS 3,230,242  1/1966  Fink _____ 260—448.2 N
3,393,218  5/1968  Van Wazer et al. __ 260—448.2 N DELBERT E. GANTZ, Primary Examiner P. F. SHAVER, Assistant Examiner U.S. Cl. X.R.

260—46.5 E, 448.2 E, 448.2 H